United States Patent
Urbanski et al.

(10) Patent No.: US 11,389,745 B2
(45) Date of Patent: Jul. 19, 2022

(54) LIQUID DE-ENTRAINMENT IN HEAT EXCHANGE EQUIPMENT

(71) Applicant: ExxonMobil Technology and Engineering Company, Annandale, NJ (US)

(72) Inventors: Nicholas F. Urbanski, Katy, TX (US); Todd P. Marut, Hamilton, VA (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 16/950,430

(22) Filed: Nov. 17, 2020

(65) Prior Publication Data

US 2021/0178284 A1 Jun. 17, 2021

Related U.S. Application Data

(60) Provisional application No. 62/947,608, filed on Dec. 13, 2019.

(51) Int. Cl.
| | |
|---|---|
| *B01D 3/32* | (2006.01) |
| *B01D 1/30* | (2006.01) |
| *B01D 1/04* | (2006.01) |
| *B01D 45/16* | (2006.01) |
| *F28D 1/04* | (2006.01) |
| *F28D 21/00* | (2006.01) |

(52) U.S. Cl.
CPC .............. *B01D 3/32* (2013.01); *B01D 1/04* (2013.01); *B01D 1/305* (2013.01); *B01D 45/16* (2013.01); *F28D 1/04* (2013.01); *F28D 2021/0064* (2013.01)

(58) Field of Classification Search
CPC . B01D 1/04; B01D 1/305; B01D 3/32; B01D 45/16; F28D 1/04; F28D 2021/0064
See application file for complete search history.

(56) References Cited

U.S. PATENT DOCUMENTS

| | | | | |
|---|---|---|---|---|
| 3,423,294 | A * | 1/1969 | Sephton | F28F 13/12 203/10 |
| 3,457,982 | A * | 7/1969 | Sephton | B01D 1/10 159/13.2 |
| 4,483,696 | A * | 11/1984 | Zipay | B01D 45/16 55/440 |
| 4,565,554 | A * | 1/1986 | Zipay | B01D 45/16 55/348 |

(Continued)

*Primary Examiner* — Jonathan Miller
(74) *Attorney, Agent, or Firm* — Vorys, Sater, Seymour and Pease LLP

(57) ABSTRACT

A kettle reboiler includes a shell, a liquid reservoir defined within the shell to contain a first process fluid, and a tube bundle positioned within the liquid reservoir and at least partially submergible in the first process fluid, the tube bundle being configured to circulate a second process fluid that causes the first process fluid to boil and discharge a vapor-liquid mixture. A liquid-vapor separation assembly is positioned in the shell and includes a separation deck, and a plurality of separation devices mounted to the separation deck, each separation device being operable to de-entrain liquid from the vapor-liquid mixture and discharge a vapor. A vapor outlet nozzle is coupled to the shell to receive the vapor discharged from the plurality of separation devices.

19 Claims, 3 Drawing Sheets

(56) References Cited

U.S. PATENT DOCUMENTS

| | | | | |
|---|---|---|---|---|
| 4,629,481 | A * | 12/1986 | Echols | B01D 45/16 122/34 |
| 4,783,204 | A * | 11/1988 | Roarty | B04C 3/00 95/269 |
| 4,856,461 | A * | 8/1989 | Hayes | F22B 37/266 122/488 |
| 5,130,082 | A * | 7/1992 | Oosterkamp | G21C 15/16 376/371 |
| 5,330,624 | A * | 7/1994 | Ebert | B01D 3/322 122/405 |
| 5,531,811 | A * | 7/1996 | Kloberdanz | B01D 45/12 166/105.5 |
| 5,561,987 | A * | 10/1996 | Hartfield | B01D 1/04 165/117 |
| 6,036,749 | A * | 3/2000 | Ribeiro | B01D 19/0052 95/261 |
| 6,293,112 | B1 * | 9/2001 | Moeykens | F28D 3/04 62/84 |
| 6,656,327 | B2 * | 12/2003 | Salmisuo | B01D 1/065 122/491 |
| 8,833,437 | B2 * | 9/2014 | Singh | F22B 1/167 165/129 |
| 9,541,314 | B2 * | 1/2017 | Numata | F28D 3/02 |
| 9,810,458 | B2 * | 11/2017 | Hattori | F28D 5/02 |
| 10,086,385 | B2 * | 10/2018 | Kvamsdal | B01D 46/521 |
| 10,845,125 | B2 * | 11/2020 | Wilson | F25B 39/028 |
| 11,105,558 | B2 * | 8/2021 | Wilson | F28D 7/16 |

* cited by examiner

LIQUID DE-ENTRAINMENT IN HEAT EXCHANGE EQUIPMENT

CROSS REFERENCE TO RELATED APPLICATIONS

This application claims priority to U.S. Provisional Application Ser. No. 62/947,608 filed Dec. 13, 2019, which is herein incorporated by reference in its entirety.

FIELD

The present disclosure is related to heat exchanger designs and, more particularly, to kettle reboilers that incorporate a liquid-vapor separation assembly configured to de-entrain (remove) liquid droplets from a vapor-liquid mixture prior to exiting the kettle reboiler.

BACKGROUND

Heat exchange equipment can take many forms. A kettle reboiler (alternately referred to as "vaporizer") is one example of a heat exchanger and typically includes a plurality of tubes (commonly referred to as a "tube bundle") residing within a pressure vessel or "shell". The tube bundle is submerged within a first process fluid pumped or otherwise conveyed into the shell. The first process fluid is a substantially liquid-phase fluid that boils and vaporizes as it exchanges heat with a second process fluid circulated through the tube bundle at elevated temperatures. The second process fluid cools and/or condenses as it circulates through the tube bundle and exchanges thermal energy with the first process fluid through the walls of the tubes. The second process fluid is then discharged from the tube bundle and the kettle reboiler to potentially be reheated and recycled back through the tube bundle.

Boiling the first process fluid creates a fluctuating biphasic froth layer that forms at the vapor-liquid interface near the upper surface of first process fluid. A substantially vapor-phase dominated biphasic region exists above the froth layer in which liquid droplets of the first process fluid reside of varying size distribution. Unless otherwise removed, the liquid droplets of the vaporized first process fluid will exit the kettle reboiler via one or more vapor outlet nozzles generally provided at the top of the shell. The presence of liquid droplets in the vapor phase exiting the kettle reboiler is often not a cause for further process or mechanical concern. In some cases, however, the liquid droplets need to be eliminated to prevent damage to liquid-sensitive downstream equipment, such as compressors.

Liquid droplet entrainment in the exiting vapor stream can be reduced by decreasing the velocity of the vapor phase residing above the froth layer, which can be done by 1) increasing the kettle reboiler size (e.g., diameter) and/or 2) increasing the number of vapor outlet nozzles. While directionally decreasing the vapor velocity and the liquid droplet entrainment, both of these methods, however, also increase the cost of the kettle reboiler due to additional material needed for the larger diameter, the increased footprint, and the additional associated plumbing. Depending on the service application, some fraction of these increases may be mitigated by using demisting pads, screens, collection vanes, splash baffles, dry-pipes, or inertial separators placed within the shell of the kettle reboiler, and occupying the same space as the substantially vapor-phase dominated biphasic region.

Additionally, a separate vessel called a "knockout drum" can be installed after the vapor outlet nozzles to remove liquid droplets from the exiting vapor stream. At some future time, however, the kettle reboiler will most likely operate at process rates greater than the original design case. Consequently, the liquid droplets entrained in the vapor outlet stream might soon exceed the desired maximum, causing the downstream knock-out drum to not perform as designed, and thereby conveying liquid droplets downstream to liquid-sensitive equipment.

Another way to avoid the consequences of liquid droplet carry-over in kettle reboilers is to lower the fluid level of the substantially liquid-phase first process fluid, which helps minimize liquid droplet entrainment. While directionally valid, i.e., lowering the fluid level will increase the volume and vertical spacing for vapor-liquid separation within the kettle reboiler, lowering the fluid level of the first process fluid can result in insufficiently wetted tube surfaces of the tube bundle. More specifically, low levels of the first process fluid can accelerate fouling, corrosion, and overstress of the tube-to-tube sheet joints, and can generate local hot spots on exposed tubes, which could lead to eventual tube failure. Even if these issues do not materialize, operating at a lower reservoir level creates a premature bottleneck on the unit and reduces the potential capacity of the process.

Despite best efforts to develop a kettle reboiler design that not only achieves a desired heat transfer, but also satisfies the maximum allowable liquid droplet entrainment in the vapor outlet stream, kettle reboilers still experience issues meeting the maximum allowable liquid entrainment value.

SUMMARY

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one or more aspects, a kettle reboiler is disclosed and includes a shell, a liquid reservoir defined within the shell to contain a first process fluid, a tube bundle positioned within the liquid reservoir and at least partially submergible in the first process fluid, the tube bundle being configured to circulate a second process fluid that causes the first process fluid to boil and dis-charge a vapor-liquid mixture, a liquid-vapor separation assembly positioned in the shell and including a separation deck, and a plurality of separation devices mounted to the separation deck, each separation device being operable to de-entrain liquid from the vapor-liquid mixture and discharge a vapor, and a vapor outlet nozzle coupled to the shell to receive the vapor discharged from the plurality of separation devices. In a further aspect of the kettle reboiler, each separation device comprises a body mounted to the separation deck and defining a central flow passage that receives a portion of the vapor-liquid mixture, and a cyclonic flow initiator arranged within the central flow passage and including a helical structure that defines a helical plane extending about a central axis of the cyclonic flow initiator along a helical path, wherein, as the portion of the vapor-liquid mixture traverses the helical path, the liquid within the portion of the vapor-liquid mixture is urged radially outward to separate the liquid from the vapor. In a further aspect of the kettle reboiler, the body includes an outer shell, an inner shell at least partially arranged within the outer shell, a liquid flow passage defined between the outer and inner shells, and a plurality of apertures defined in the inner shell and facilitating fluid communication between the central flow passage and the liquid flow passage to re-move the liquid from the central flow passage. In a further aspect of the kettle reboiler, the liquid flow passage fluidly communicates with a top of the separation deck to deposit the liquid on the top of the separation deck. In a further aspect, the kettle reboiler further includes one or more ribs provided on an inner wall of the inner shell and extending into the central flow passage. In a further aspect of the kettle reboiler, at least one of a width, a pitch, and an angle of the helical structure varies along an axial length of the cyclonic flow initiator. In a further aspect of the kettle reboiler, at least one of an upper surface and a lower surface of the helical plane defines a structure selected from the group consisting of a dimple, a corrugation, a fin, and any combination thereof. In a further aspect of the kettle reboiler, an edge of the helical structure de-fines a structure selected from the group consisting of a notch, a half-circle, a scallop, and any combination thereof, a corrugation, a fin, and any combination thereof. In a further aspect, the kettle reboiler further includes a center post extending along the central axis, wherein the helical structure is coupled to and extends about the center post, and a support structure coupled to the center post to support the cyclonic flow initiator within the central flow passage. In a further aspect, the kettle reboiler further includes a downcomer fluidly coupled to the separation deck to receive the liquid de-entrained from the vapor-liquid mixture. In a further aspect of the kettle reboiler, the downcomer extends downward from the separation deck at a point above the liquid reservoir to deposit the liquid into the liquid reservoir. In a further aspect, the kettle reboiler further includes a liquid outlet chamber defined within the shell, wherein the downcomer extends downward from the separation deck at a point above the liquid outlet chamber to deposit the liquid into the liquid outlet chamber. In a further aspect of the kettle reboiler, at least a portion of the separation deck is sloped to flow the liquid toward the downcomer.

In one or more additional aspects, a method of operating a kettle reboiler is disclosed and includes containing a first process fluid in a liquid reservoir defined within a shell of the kettle reboiler, circulating a second process fluid through a tube bundle positioned within the liquid reservoir and at least partially submerged in the first process fluid, boiling the first process fluid as the second process fluid circulates through the tube bundle and thereby discharging a vapor-liquid mixture from the first process fluid, receiving the vapor-liquid mixture at a liquid-vapor separation assembly positioned in the shell, the liquid-vapor separation assembly including a separation deck and a plurality of separation devices mounted to the separation deck, de-entraining liquid from the vapor-liquid mixture with the plurality of separation devices and discharging a vapor from the plurality of separation devices, and receiving the vapor discharged from the plurality of separation devices at a vapor outlet nozzle coupled to the shell. In a further aspect of the method, each separation device comprises a body mounted to the separation deck and defining a central flow passage, and a cyclonic flow initiator arranged within the central flow passage and including a helical structure that defines a helical plane extending about a central axis of the cyclonic flow initiator along a helical path, the method further including receiving a portion of the vapor-liquid mixture in the central flow passage, flowing the portion of the vapor-liquid mixture along the helical path, and urging the liquid within the portion of the vapor-liquid mixture radially outward and thereby separating the liquid from the vapor as the portion of the vapor-liquid mixture flows along the helical path. In a further aspect of the method, the body includes an outer shell, an inner shell at least partially arranged within the outer shell, a liquid flow passage de-fined between the outer and inner shells, and a plurality of apertures defined in the inner shell, the method further including receiving the liquid in the liquid flow passage via the plurality of apertures defined in the inner shell, flowing the liquid from the liquid flow passage to a top of the separation deck, and flowing the liquid on the top of the separation deck toward a downcomer. In a further aspect of the method, the downcomer extends downward from the separation deck at a point above the liquid reservoir, the method further including depositing the liquid into the liquid reservoir from the downcomer. In a further aspect of the method, a liquid outlet chamber is defined within the shell and the downcomer extends downward from the separation deck at a point above the liquid outlet chamber, the method further including depositing the liquid into the liquid outlet chamber from the downcomer. In a further aspect of the method, the helical structure is coupled to and ex-tends about a center post extending along the central axis, the method further including supporting the cyclonic flow initiator within the central flow passage with a support structure coupled to the center post. In a further aspect, the method further includes varying at least one of a width, a pitch, and an angle of the helical structure along an axial length of the cyclonic flow initiator.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DESCRIPTION

The present disclosure is related to heat exchanger designs and, more particularly, to kettle reboilers that incorporate a liquid-vapor separation assembly configured to de-entrain (remove) liquid droplets from a vapor-liquid mixture prior to exiting the kettle reboiler.

The following disclosure describes an effective means to reduce the liquid droplet entrainment in kettle reboilers and vaporizers already in operation. The principles of the present disclosure may reduce the plot size and piping complexity of grassroots kettle reboilers if considered during the thermal/ hydraulic and final process and mechanical design. Moreover, the principles of the present disclosure following disclosure incorporate technologies that reduce the vertical distance (space within the existing kettle reboiler shell) to optimize the available volume above the tube bundle to achieve the required liquid entrainment through the vapor outlet nozzles, thereby reducing cost and complexity of the kettle reboiler design. Effective liquid droplet de-entrainment within the kettle shell could negate a common requirement for a knock-out vessel downstream of a kettle reboiler, thereby reducing the capital cost of that piece of equipment, decreasing the amount of associated piping and plot space, achieving a goal of installing minimum kit, and supporting the modularization of equipment for increased capital efficiency. The embodiments described herein include a liquid-vapor separation assembly arranged within the shell of a kettle reboiler, which is not widely industrially accepted as a best practice, except for steam generation.

Figure 1:
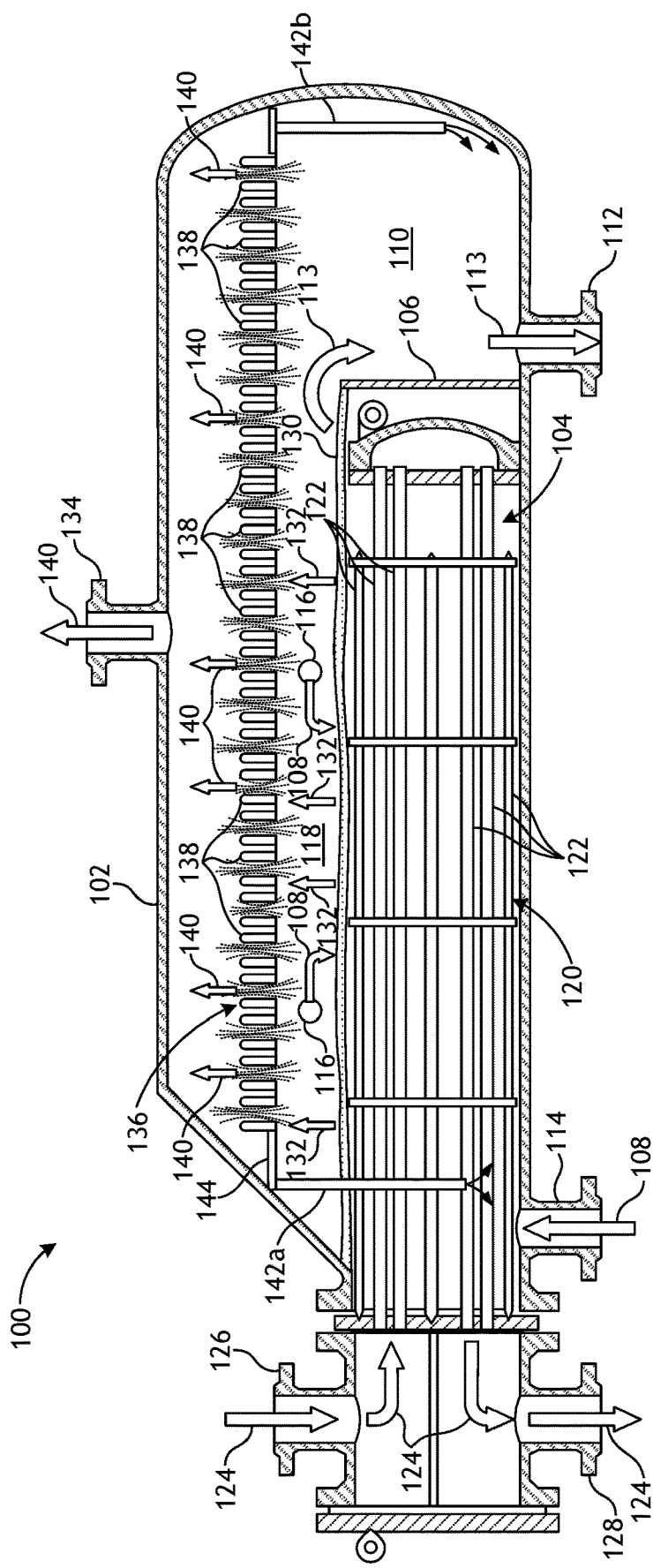
FIG. 1 is an example kettle reboiler that incorporates the principles of the present disclosure.

FIG. 1 is an example kettle reboiler 100 that incorporates the principles of the present disclosure. As illustrated, the kettle reboiler 100 (hereafter "the reboiler 100") includes a main body or "shell" 102 that comprise a type of pressure vessel. The shell 102 may be made of any material capable of withstanding elevated temperatures and pressures, such as stainless steel.

A liquid reservoir 104 is provided or otherwise defined within the interior of the shell 102. The liquid reservoir 104 may be defined partially by the bottom and adjacent sidewalls of the shell 102 and a barrier or "weir" 106 arranged within the shell 102. The liquid reservoir 104 is configured to receive and contain a first process fluid 108, and the weir 106 serves partially as a retaining wall to contain the first process fluid 108 within the liquid reservoir 104. In addition, the weir 106 separates the liquid reservoir 104 from a liquid outlet chamber 110 also defined or provided within the shell 102. Residual portions of the first process fluid 108 can flow over the weir 106 and be withdrawn from the shell 102 via an outlet nozzle 112, as indicated by the arrows 113. The residual portions exit the reboiler 100 and proceed to downstream equipment such as vessels, pumps, fractionation columns, etc.

In some embodiments, the first process fluid 108 may be conveyed or pumped into the liquid reservoir 104 via a liquid inlet nozzle 114 provided on the shell 102. In such embodiments, the first process fluid 108 may comprise a liquid-phase fluid. In other embodiments, however, the first process fluid 108 may be introduced into the shell 102 as a bi-phasic fluid including both liquid and gas in varying amounts. In such embodiments, the first process fluid 108 may be introduced into the shell 102 via one or more bi-phasic ports 116 (two shown) provided on the sidewall of the shell 102. The liquid portion of the bi-phasic first process fluid 108 may be deposited in the liquid reservoir 104, and the gaseous portion of the bi-phasic first process fluid 108 may remain in a bi-phasic vapor region 118 provided above the liquid reservoir 104.

The first process fluid 108 is conveyed (deposited) into the liquid reservoir 104 to be boiled and transitioned at least partially to a vapor-phase (i.e., vaporized). Accordingly, the first process fluid 108 can comprise any liquid desired to be converted into vapor phase for processing. In some embodiments, for example, the reboiler 100 may be utilized in the oil and gas industry and the first process fluid 108 may comprise any of $C_1$-$C_5$ originating from upstream equipment such as vessels, pumps, fractionation columns, etc.

A tube bundle 120 is arranged within the shell 102 and positioned within the liquid reservoir 104 to be substantially or entirely submerged in the first process fluid 108 contained within the liquid reservoir 104. The tube bundle 120 includes one or more tubes 122 configured to receive and circulate a second process fluid 124. In some embodiments, the tube bundle 120 may comprise a straight-tube design where the tubes 122 extend into the liquid reservoir 104 toward a tubesheet arranged at the opposite end of the shell 102, and the tubesheet re-routes the second process fluid 124 back the other way within other tubes 122. In other embodiments, however, the tube bundle 120 may comprise a U-tube design where the tubes 122 extend into the liquid reservoir 104 and form a "U" bend at the distal end to re-route the second process fluid 124 back the other way within other tubes 122. The particular design of the tube bundle 120 will depend on process and mechanical design considerations, but is not necessarily vital to the principles of the present disclosure.

The second process fluid 124 enters the reboiler 100 at an inlet nozzle 126 and is subsequently conveyed into the tube(s) 122 of the tube bundle 120. The second process fluid 124 may comprise any fluid (i.e., gas or liquid) that enters the reboiler 100 at an elevated temperature and thereby causes active boiling of the first process fluid 108 as it circulates through the tube bundle 120. Examples of the second process fluid 124 include, but are not limited to, water, steam, a hydrocarbon, oil, or any combination thereof.

The second process fluid 124 is circulated through the tube bundle 120 at an elevated temperature and is cooled and/or condensed as it exchanges thermal energy with the first process fluid 108 through the walls of the tube(s) 122. The second process fluid 124 exits the reboiler 100 at a reduced-temperature via an outlet nozzle 128. As it passes through the tube bundle 120, the second process fluid 124 may remain a vapor, remain a liquid, or change phase from vapor to liquid in some percentage, depending on process requirements. In some cases, the reduced-temperature second process fluid 124 may be reheated and recycled back to the inlet nozzle 126 to be reintroduced into the tube bundle 120.

Boiling the first process fluid 108 creates a fluctuating biphasic froth layer 130 that forms at the vapor-liquid interface near the upper surface of the first process fluid 108. The bi-phasic vapor region 118 exists above the froth layer 130 and consists essentially of a vapor-liquid mixture 132 generated as the first process fluid 108 boils in the liquid reservoir 104. The froth layer 130 tends to be more liquid-phase dominant in its biphasic character, and transitions the further it gets from the upper surface of the first process fluid 108 until becoming the vapor-phase dominant vapor-liquid mixture region 132. The vapor-liquid mixture 132 is the result of initial de-entrainment of the froth 130 as a majority of the liquid phase drops out and returns to the first process fluid 108 in the liquid reservoir 104 for further boiling or proceeds to the liquid outlet chamber 110 for further processing by downstream equipment.

In conventional kettle reboilers, unless somehow returned to the liquid reservoir 104 or discharged from the shell 102 via the outlet nozzle 112 with the residual portions 113 of the first process fluid 108, the liquid droplets of the vapor-liquid mixture 132 residing in the bi-phasic vapor region 118 will typically exit conventional kettle reboilers via one or more vapor outlet nozzles 134 provided at or near the top of the shell 102. According to embodiments of the present disclosure, however, a liquid-vapor separation assembly 136 (alternately referred to as a "de-entrainment assembly") may be positioned in the shell 102 within the bi-phasic vapor region 118 and capable of de-entraining (separating) the liquid droplets of the vapor-liquid mixture 132 prior to exiting the reboiler 100 via the vapor outlet nozzle(s) 134.

The liquid-vapor separation assembly 136 (hereafter "the assembly 136") may include a plurality of vapor-liquid separation devices 138. Each separation device 138 may be configured to receive a portion of the vapor-liquid mixture 132 originating from the first process fluid 108, to de-entrain (separate) liquid droplets from the vapor-liquid mixture 132, and discharge a substantially liquid-free vapor 140 that can be exit the shell 102 via the vapor outlet nozzle(s) 134. The de-entrained liquid droplets may then be collected and returned in liquid form to either the liquid reservoir 104 via one or more first downcomers 142a or the liquid outlet chamber 110 via one or more second downcomers 142b.

As illustrated, the assembly 136 includes a separation deck 144, and the separation devices 138 may be mounted to the separation deck 144. In some embodiments, the separation deck 144 is secured to the inner walls of the shell 102, but may alternatively be supported in the shell 102 within the bi-phasic vapor region 118 without being coupled to the inner walls, such as with one or more vertical supports (not shown). In some embodiments, the outer perimeter of the separation deck 144 may be sealed to the inner walls of the shell 102, thus forcing all of the vapor-liquid mixture 132 to pass through the separation devices 138 to access the vapor outlet nozzle(s) 134. In other embodiments, however, the outer perimeter of the separation deck 144 need not be sealed to the inner walls of the shell 102.

The first downcomer(s) 142a extends downward from the separation deck 144 at a point above the liquid reservoir 104 to deposit separated liquids back into the liquid reservoir 104. The second downcomer(s) 142b extends downward from the separation deck 144 at a point above the liquid outlet chamber 110 to deposit separated liquids into the liquid outlet chamber 110 to be removed from the shell 102 via the outlet nozzle 112. While only one first downcomer 142a and one second downcomer 142b are shown, more than one of each downcomer 142a,b may be employed, without departing from the scope of the disclosure. Furthermore, embodiments are contemplated herein where the assembly 136 includes only the first downcomer(s) 142a or only the second downcomer(s) 142b. Moreover, although depicted as the same size, shape, length, and configuration, the downcomers 142a,b may be of varying size, shape, length, and configuration to provide for self-venting flow and allow for removal of the tube bundle 120 from the shell 102. As will be appreciated, the number, design, shape, and location of the downcomers 142a,b may be determined according to best practices and mechanical design review.

Figure 2:
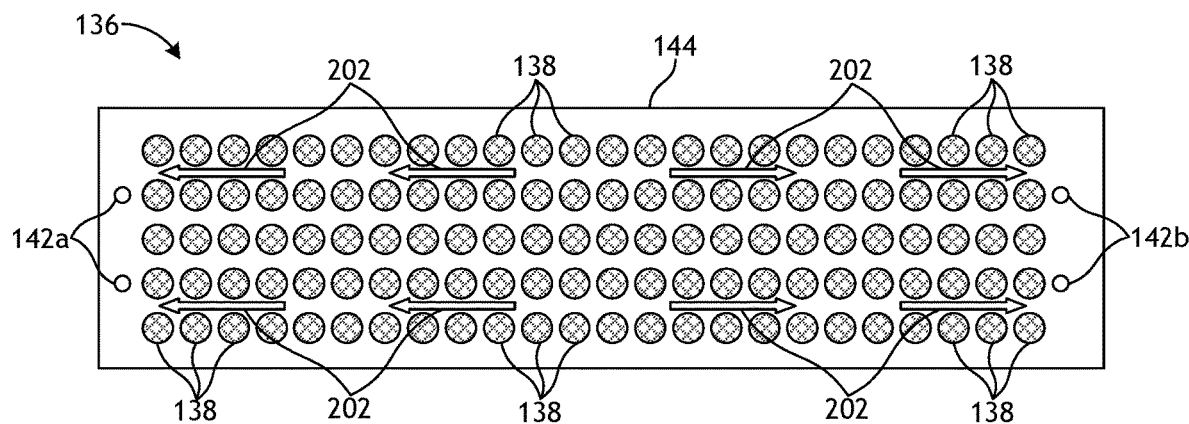
FIG. 2 is a top view of the assembly of FIG. 1, according to one or more embodiments.

FIG. 2 is a top view of the assembly 136 of FIG. 1, according to one or more embodiments. In some embodiments, as illustrated, the separation deck 144 may exhibit a generally rectangular shape. In other embodiments, however, the separation deck 144 may exhibit other polygonal shapes, such as triangular, square, pentagonal, etc. In yet other embodiments, the separation deck 144 may alternatively exhibit a circular, elliptical, or ovoid shape, or any combination of the foregoing, without departing from the scope of the disclosure. In some embodiments, the separation deck 144 may comprise a one-piece structure, but may alternatively be fabricated and otherwise assembled from multiple pieces. Moreover, although depicted as a single separation deck 144, it is contemplated herein that the assembly 136 employ multiple separation decks 144 and/or a tiered configuration of multiple separation decks 144, without departing from the scope of the disclosure.

In the illustrated embodiment, the assembly 136 includes two first downcomers 142a and two second downcomers 142b, but could alternatively include more or less than two first and second downcomers 142a,b. In the illustrated embodiment, the opening to each downcomer 142a,b is generally circular, but could alternatively be polygonal, oval, ovoid, or any combination thereof, without departing from the scope of the disclosure. Adequate drainage of the separation deck 144 will determine the size, shape, and dimensions of the downcomers 142a,b. As will be appreciated, the particular location of the downcomers 142a,b on the separation deck 144 is representative only and not meant to be restrictive in the realization of the present disclosure.

In some embodiments, portions of the separation deck 144 may be sloped or otherwise angled to feed (flow) the collected liquid toward either or both downcomers 142a,b. In at least one embodiment, for example, the separation deck 144 may exhibit a higher elevation at the center of the separation deck 144 as compared to the lateral sides (ends). As a result, collected liquid discharged from the separation devices 138 will naturally drain (flow) toward either or both downcomers 142a,b located at the lateral sides of the separation deck 144, as indicated by the arrows 202. In at least one embodiment, the liquid flow in the direction indicated by the arrows 202 may be enhanced via shallow troughs or corrugations defined in the separation deck 144 to collect and direct the liquid to the downcomers 142a,b.

As illustrated, multiple separation devices 138 are arranged on the separation deck 144 and spaced from each other. The number, design, shape, size, spacing, and layout pattern of the separation devices 138 may be determined according to best practices (and mechanical design review) to achieve a desired vapor outlet liquid entrainment ratio required for the specific service. Moreover, the layout pattern of the separation devices 138 need not be the same across the separation deck 144. For instance, variations in one or more of the number, size, and layout pattern of the separation devices 138 may be required to address vapor generation differences along the length of the tube bundle 120 (FIG. 1) as well as possible maldistribution of the first process fluid 108 (FIG. 1) into the liquid reservoir 104 (FIG. 1).

Figure 3:
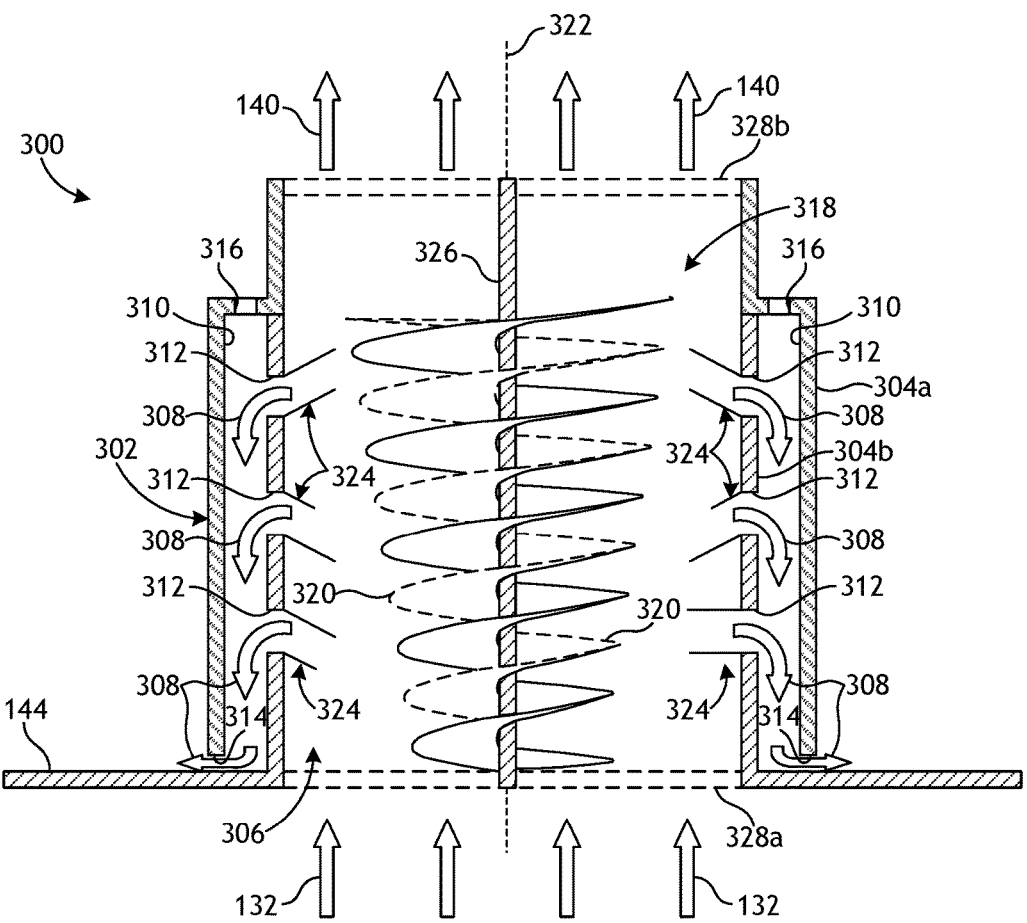
FIG. 3 is a cross-sectional side view of an example separation device, according to one or more embodiments.

FIG. 3 is a cross-sectional side view of an example separation device 300, according to one or more embodiments. The separation device 300 may be the same as or similar to any of the separation devices 138 described above with reference to FIG. 1 or 2 and, therefore, may be best understood with reference thereto. As illustrated, the separation device 300 has a body 302 that may be mounted to the separation deck 144. The body 302 may be removably or permanently attached to the separation deck 144 using any suitable attachment means such as, but not limited to, one or more mechanical fasteners, welding, brazing, an adhesive, an interference (shrink) fit, or any combination thereof.

The body 302 may include an outer shell 304a and an inner shell 304b at least partially arranged within the outer shell 304a. The inner shell 304b defines a central flow passage 306 that receives the vapor-liquid mixture 132 discharged from the first process fluid 108 (FIG. 1) as it boils in the liquid reservoir 104 (FIG. 1). The separation device 300 may be designed and otherwise configured to receive the vapor-liquid mixture 132 and separate (de-entrain) liquid 308 from the vapor-liquid mixture 132 such that the substantially liquid-free vapor 140 may be discharged from the central flow passage 306 at or near the top of the separation device 300.

The outer and inner shells 304a,b may be radially offset (separated) from each other a short distance and a liquid flow passage 310 may be defined therebetween. The liquid 308 separated or otherwise de-entrained from the vapor-liquid mixture 132 may be able to enter the liquid flow passage 310 through one or more apertures 312 defined in the sidewall of the inner shell 304b. The apertures 312 may exhibit varying shapes, dimensions, and pitch (e.g., number in the axial direction). As depicted, at least a portion of the outer shell 304a does not extend to the top of the separation deck 144 and is otherwise offset therefrom to define a liquid outlet 314 that facilitates fluid communication between the liquid flow passage 308 and the top of the separation deck 144. Consequently, the liquid 308 entering the liquid flow passage 310 via the apertures 312 can flow out of the liquid flow passage 310 and onto the top of the separation deck 144 via the liquid outlet 314. Once on the top of the separation deck 144, the collected liquid 308 may flow toward one or both of the downcomers 142a,b (FIGS. 1 and 2) to be returned to one or both of the liquid reservoir 104 (FIG. 1) and the liquid outlet chamber 110 (FIG. 1). In one or more embodiments, the size of the liquid outlet 314 may be determined to create an amount of liquid backup into the liquid flow passage 310 so as to create a liquid seal that prevents vapor flow from entering the liquid outlet 314, which would otherwise hinder the drainage of the liquid 308 from the liquid flow passage 310.

In some embodiments, one or more vent holes 316 may be defined at or near the top of the outer shell 304a to facilitate fluid communication between the liquid flow passage 310 and exterior to the separation device 300. The vent holes 316 may prove advantageous in allowing vapor 140 and/or non-condensable gases that may have entered the liquid flow passage 310 to escape the liquid flow passage 310. More particularly, should the vapor 140 become trapped in the upper sections of the liquid flow passage 310, this might hinder the ability of droplets of the liquid 308 to enter the liquid flow passage 310. Instead, the vent holes 316 allow any captured vapor 140 to escape without having to move against gravity down the liquid flow passage 310 to exit at the liquid flow outlet 314.

To help separate the liquid 308 from the vapor-liquid mixture 132, the separation device 300 may further include a cyclonic flow initiator 318 generally arranged within the central flow passage 306. As illustrated, the cyclonic flow initiator 318 may include one or more helical structures 320 (partially shown in dashed lines) that extend about a central axis 322 of the cyclonic flow initiator 318 in a generally helical manner or direction. In other words, the one or more helical structures 320 extend about the central axis 322 in the shape or form of a helix or spiral. In some embodiments, the helical structure 320 may comprise a single helical plane or surface extending helically about the central axis 322, also referred to as a "single helix". In other embodiments, however, the helical structure 320 may comprise two helical planes or surfaces extending helically about the central axis 322, also referred to as a "double helix". In yet other embodiments, the helical structure 320 may comprise three helical planes or surfaces extending helically about the central axis 322, also referred to as a "triple helix". In the illustrated embodiment, the helical structure 320 is depicted as a double helix.

As it enters the separation device 300 and flows through the central flow passage 306, the vapor-liquid mixture 132 impinges upon the cyclonic flow initiator 318 and at least a portion of the vapor-liquid mixture 132 will be forced to follow a generally helical path and swirling flow pattern defined by the helical structure(s) 320. As the vapor-liquid mixture 132 traverses the defined helical path of the helical structure(s) 320, centripetal forces will act on the vapor-liquid mixture 13, and molecules in the vapor-liquid mixture 132 that are more dense (e.g., the liquid 308) will be forced radially outward and toward the inner walls of the central flow passage 306. In contrast, molecules in the vapor-liquid mixture 132 that are less dense (e.g., the vapor 140) will remain relatively centered along the central axis 322 and flow through the middle of the separation device 300. Consequently, as the vapor-liquid mixture 132 flows through the separation device 300, the more-dense liquid 308 will tend to flow radially outward toward the inner shell 304b and enter the liquid flow passage 310 via the apertures 312. In contrast, the vapor 140 will generally flow axially along the central axis 322 as the vapor-liquid mixture 132 flows through the separation device 300, and discharged out the top of the separation device 300.

In some embodiments, the helical structure 320 may exhibit the same width (radial depth from the central axis 322), pitch, and angle along the axial length of the cyclonic flow initiator 318. In other embodiments, one or more of the width, the pitch, and the angle of any of the helical structures 320 may vary from bottom to top along the central axis 322 to best achieve efficient vapor-liquid separation.

In some embodiments, one or both of the upper and lower surfaces of the helical plane of the helical structure 320 may be flat and otherwise smooth. In other embodiments, however, one or both of the upper and lower surfaces of the helical plane of the helical structure 320 may be discontinuous and otherwise define structures of varying shapes and dimensions. For example, in some embodiments, one or both of the upper and lower surfaces may provide or define dimples, corrugations, fins, or any combination thereof. Such surface features may be advantageous in helping to improve vapor-liquid separation as compared to that achieved by flat surfaces.

In some embodiments, the edge(s) of the helical structure 320 may be smooth, flat, and otherwise continuous. In other embodiments, however, the edge(s) of the helical structure 320 may be discontinuous and otherwise define various structures of varying shapes and dimensions. For example, in some embodiments, the edge(s) of the helical structure 320 may provide or define notches, half-circles, scallops, or any combination thereof. Such structures may be advantageous in helping to improve vapor-liquid separation as compared to that achieved by flat edges.

In some embodiments, one or more ribs 324 may be provided on the inner wall of the inner shell 304b and extend into the central flow passage 306. The rib(s) 324 may extend from the inner wall of the inner shell 304b in general alignment above and/or below one or more of the apertures 312. In operation, the rib(s) 324 may be configured to help direct (funnel) the liquid 308 separated from the vapor-liquid mixture 132 into the apertures 312. In some embodiments, one or more of the ribs 324 may provide or otherwise define a complementary helical pattern that generally matches that of the helical structure 320. As will be appreciated, this may help radially extend the helical path and swirling flow pattern of the helical structure 320 that the vapor-liquid mixture 132 must traverse as it flows through the separation device 300, thus providing additional surface area for the liquid 308 to separate from the vapor-liquid mixture 132. In other embodiments, however, the rib(s) 324 may comprise independent rings extending about the inner diameter of the inner shell 304b above and/or below one or more of the apertures 312.

In some embodiments, one or more of the rib(s) 324 may be angled down with respect to the central axis 322 (i.e., toward the separation deck 144). In such embodiments, the rib(s) 324 may function somewhat similar to directional louvers mounted to the inner wall of the inner shell 304b. Alternatively, one or more of the rib(s) 324 may be angled up with respect to the central axis 322 (i.e., away from the separation deck 144). In other embodiments, one or more of the rib(s) 324 may extend perpendicular to the central axis 322, without departing from the scope of the disclosure. In some embodiments, the rib 324 located above a particular aperture 312 may be longer than the rib 324 located below the particular aperture 312. In other embodiments, the rib 324 located above a particular aperture 312 may be shorter than the rib 324 located below the particular aperture 312. In yet other embodiments, the ribs 324 located above and below a particular aperture 312 may be the same length. In even further embodiments, the rib 324 may be omitted either above or below a particular aperture 312, or both above and below the particular aperture 312.

Similar to the helical structure 320, one or both of the upper and lower surfaces of the rib(s) 324 may be flat and otherwise smooth. In other embodiments, however, one or both of the upper and lower surfaces of the rib(s) 324 may be discontinuous and otherwise define structures of varying shapes and dimensions. For example, in some embodiments, one or both of the upper and lower surfaces may provide or define dimples, corrugations, fins, or any combination thereof. Such surface features may be advantageous in helping to improve vapor-liquid separation over that achieved by flat surfaces. Similarly, the edge(s) of the rib(s) 324 may be smooth, flat, and otherwise continuous. In other embodiments, however, the edge(s) of the rib(s) 324 may be discontinuous and otherwise define various structures of varying shapes and dimensions. For example, in some embodiments, the edge(s) of the rib(s) 324 may provide or define notches, half-circles, scallops, or any combination thereof. Such structures may be advantageous in helping to improve vapor-liquid separation over that achieved by flat edges.

In some embodiments, the cyclonic flow initiator 318 may include a center post 326 that extends along the central axis 322 of the separation device 300 within the central flow passage 306. In such embodiments, the helical structure(s) 320 may be coupled to and extend about the center post 326. In other embodiments, however, the center post 326 is omitted and the helical structure(s) 320 may extend to and be coupled directly to the inner wall of the inner shell 304b or one or more of the ribs 324, without departing from the scope of the disclosure.

In embodiments including the center post 326, the separation device 300 may include a support structure to help support the cyclonic flow initiator 318 within the central flow passage 306. In some embodiments, for example, a first support structure 328a may be secured at or near the bottom of the separation device 300 and extend across the opening to the central flow passage 306, but allow the vapor-liquid mixture 132 to pass therethrough to access the central flow passage 306. The center post 326 may be coupled to the first support structure 328a to support the cyclonic flow initiator 318 within the central flow passage 306. In the illustrated embodiment, the first support structure 328a is coupled to the inner shell 304b, but could alternatively be coupled to the outer shell 304a or the separation deck 144, without departing from the scope of the disclosure.

In other embodiments, or in addition thereto, a second support structure 328b may be secured at or near the top of the separation device 300 and extend across the opening to the central flow passage 306, but allow the vapor-liquid mixture 132 to pass therethrough to exit the central flow passage 306. The center post 326 may be coupled to the second support structure 328b to support the cyclonic flow initiator 318 within the central flow passage 306. In the illustrated embodiment, the second support structure 328b is coupled to the outer shell 304a, but could alternatively be coupled to the inner shell 304a, without departing from the scope of the disclosure.

Figure 4A:
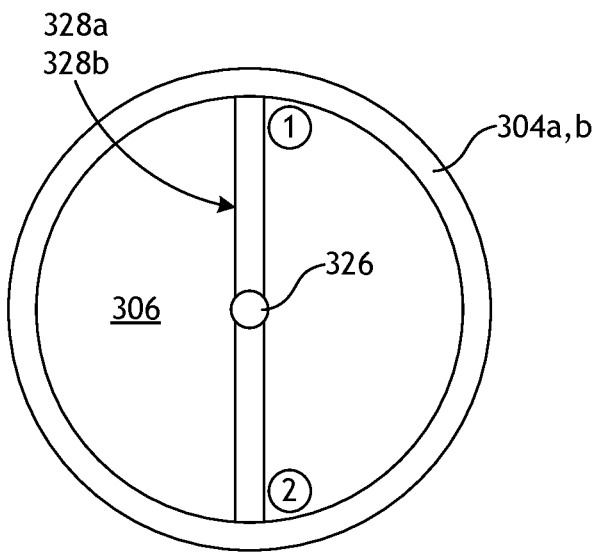
FIGS. 4A and 4B depict example embodiments of the first and second support structures of FIG. 3.
Figure 4B:
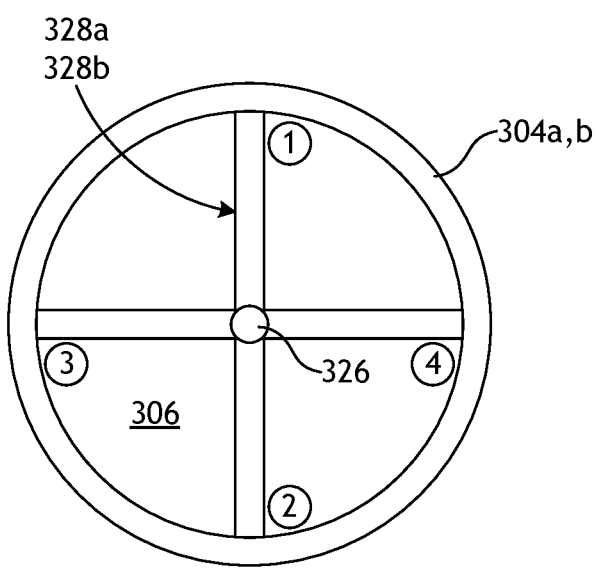

FIGS. 4A and 4B depict example embodiments of the first and second support structures 328a,b. As depicted, the support structures 328a,b may comprise multi-point structures. More specifically, FIG. 4A depicts the support structures 328a,b having two points of contact with the inner or outer shells 304a,b, and FIG. 4B depicts the support structures 328a,b having four points of contact with the inner or outer shells 304a,b. The support structures 328a,b may be coupled to the inner or outer shells 304a,b at the corresponding points of contact using a variety of attachment means including, but not limited to, welds, an adhesive, one or more mechanical fasteners, any combination thereof, or any other mechanical means of assembly that does not impede the desired vapor-liquid separation. In each embodiment, the support structure 328a,b is coupled to or otherwise supports the center post 326.

Referring again to FIG. 3, in some embodiments, the center post 326 may be coupled to or otherwise supported by one or both of the support structures 328a,b. In such embodiments, the center post 326 may be immovably coupled to one or both of the support structures 328a,b. In other embodiments, however, cyclonic flow initiator 318 may be configured for rotation about the central axis 322 and the center post 326 may instead be rotatably coupled (mounted) to one or both of the support structures 328a,b to facilitate rotation.

In some embodiments, the support structures 328a,b may be omitted and the cyclonic flow initiator 318 may nonetheless be supported within the central flow passage 306. In at least one embodiment, for example, the helical structure 320 may extend partly out of the central flow passage 306 to be coupled to the outer shell 304a by a welded, bolted, or other mechanical attachment means, and in such a way as not to impede the desired vapor-liquid separation. In other embodiments, the helical structure 320 may extend partly out of the central flow passage 306 to be coupled to the separation deck 144 by a welded, bolted, or other mechanical attachment means, and in such a way as not to impede the desired vapor-liquid separation.

Some or all of separation device 300 may be manufactured via a variety of manufacturing processes. Suitable manufacturing include, but are not limited to, casting, direct metal laser sintering (DMLS), three-dimensional (3D) printing, brazing, or any combination thereof. In embodiment where the separation device 300 is manufactured via 3D printing, the cyclonic flow initiator 318 may form an integral part of the separation device 300. Moreover, the entire assembly 136 of FIGS. 1 and 2 may be fabricated using any of the foregoing manufacturing processes.

Embodiments Listing

The present disclosure provides, among others, the following embodiments, each of which may be considered as optionally including any alternate embodiments.

Clause 1. A kettle reboiler that includes a shell, a liquid reservoir defined within the shell to contain a first process fluid, a tube bundle positioned within the liquid reservoir and at least partially submergible in the first process fluid, the tube bundle being configured to circulate a second process fluid that causes the first process fluid to boil and discharge a vapor-liquid mixture, a liquid-vapor separation assembly positioned in the shell and including a separation deck, and a plurality of separation devices mounted to the separation deck, each separation device being operable to de-entrain liquid from the vapor-liquid mixture and discharge a vapor. The kettle reboiler further including vapor outlet nozzle coupled to the shell to receive the vapor discharged from the plurality of separation devices.

Clause 2. The kettle reboiler of Clause 1, wherein each separation device comprises a body mounted to the separation deck and defining a central flow passage that receives a portion of the vapor-liquid mixture, and a cyclonic flow initiator arranged within the central flow passage and including a helical structure that defines a helical plane extending about a central axis of the cyclonic flow initiator along a helical path, wherein, as the portion of the vapor-liquid mixture traverses the helical path, the liquid within the portion of the vapor-liquid mixture is urged radially outward to separate the liquid from the vapor.

Clause 3. The kettle reboiler of Clause 2, wherein the body includes an outer shell, an inner shell at least partially arranged within the outer shell, a liquid flow passage defined between the outer and inner shells, and a plurality of apertures defined in the inner shell and facilitating fluid communication between the central flow passage and the liquid flow passage to remove the liquid from the central flow passage.

Clause 4. The kettle reboiler of Clause 3, wherein the liquid flow passage fluidly communicates with a top of the separation deck to deposit the liquid on the top of the separation deck.

Clause 5. The kettle reboiler of Clause 3, further comprising one or more ribs provided on an inner wall of the inner shell and extending into the central flow passage.

Clause 6. The kettle reboiler of Clause 2, wherein at least one of a width, a pitch, and an angle of the helical structure varies along an axial length of the cyclonic flow initiator.

Clause 7. The kettle reboiler of Clause 2, wherein at least one of an upper surface and a lower surface of the helical plane defines a structure selected from the group consisting of a dimple, a corrugation, a fin, and any combination thereof.

Clause 8. The kettle reboiler of Clause 2, wherein an edge of the helical structure defines a structure selected from the group consisting of a notch, a half-circle, a scallop, and any combination thereof, a corrugation, a fin, and any combination thereof.

Clause 9. The kettle reboiler of Clause 2, further comprising a center post extending along the central axis, wherein the helical structure is coupled to and extends about the center post, and a support structure coupled to the center post to support the cyclonic flow initiator within the central flow passage.

Clause 10. The kettle reboiler of any of the preceding Clauses, further comprising a downcomer fluidly coupled to the separation deck to receive the liquid de-entrained from the vapor-liquid mixture.

Clause 11. The kettle reboiler of Clause 10, wherein the downcomer extends downward from the separation deck at a point above the liquid reservoir to deposit the liquid into the liquid reservoir.

Clause 12. The kettle reboiler of Clause 10, further comprising a liquid outlet chamber defined within the shell, wherein the downcomer extends downward from the separation deck at a point above the liquid outlet chamber to deposit the liquid into the liquid outlet chamber.

Clause 13. The kettle reboiler of Clause 10, wherein at least a portion of the separation deck is sloped to flow the liquid toward the downcomer.

Clause 14. A method of operating a kettle reboiler including containing a first process fluid in a liquid reservoir defined within a shell of the kettle reboiler, circulating a second process fluid through a tube bundle positioned within the liquid reservoir and at least partially submerged in the first process fluid, boiling the first process fluid as the second process fluid circulates through the tube bundle and thereby discharging a vapor-liquid mixture from the first process fluid, receiving the vapor-liquid mixture at a liquid-vapor separation assembly positioned in the shell, the liquid-vapor separation assembly including a separation deck and a plurality of separation devices mounted to the separation deck, de-entraining liquid from the vapor-liquid mixture with the plurality of separation devices and discharging a vapor from the plurality of separation devices, and receiving the vapor discharged from the plurality of separation devices at a vapor outlet nozzle coupled to the shell.

Clause 15. The method of Clause 14, wherein each separation device comprises a body mounted to the separation deck and defining a central flow passage, and a cyclonic flow initiator arranged within the central flow passage and including a helical structure that defines a helical plane extending about a central axis of the cyclonic flow initiator along a helical path, the method further comprising receiving a portion of the vapor-liquid mixture in the central flow passage, flowing the portion of the vapor-liquid mixture along the helical path, and urging the liquid within the portion of the vapor-liquid mixture radially outward and thereby separating the liquid from the vapor as the portion of the vapor-liquid mixture flows along the helical path.

Clause 16. The method of Clause 15, wherein the body includes an outer shell, an inner shell at least partially arranged within the outer shell, a liquid flow passage defined between the outer and inner shells, and a plurality of apertures defined in the inner shell, the method further comprising receiving the liquid in the liquid flow passage via the plurality of apertures defined in the inner shell, flowing the liquid from the liquid flow passage to a top of the separation deck, and flowing the liquid on the top of the separation deck toward a downcomer.

Clause 17. The method of Clause 16, wherein the downcomer extends downward from the separation deck at a point above the liquid reservoir, the method further comprising depositing the liquid into the liquid reservoir from the downcomer.

Clause 18. The method of Clause 16, wherein a liquid outlet chamber is defined within the shell and the downcomer extends downward from the separation deck at a point above the liquid outlet chamber, the method further comprising depositing the liquid into the liquid outlet chamber from the downcomer.

Clause 19. The method of Clause 15, wherein the helical structure is coupled to and extends about a center post extending along the central axis, the method further comprising supporting the cyclonic flow initiator within the central flow passage with a support structure coupled to the center post.

Clause 20. The method of Clause 15, further comprising varying at least one of a width, a pitch, and an angle of the helical structure along an axial length of the cyclonic flow initiator.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A kettle reboiler, comprising:
    a shell;
    a liquid reservoir defined within the shell to contain a first process fluid;
    a tube bundle positioned within the liquid reservoir and at least partially submergible in the first process fluid, the tube bundle being configured to circulate a second process fluid that causes the first process fluid to boil and discharge a vapor-liquid mixture;
    a liquid-vapor separation assembly positioned in the shell and including:
    a separation deck; and
    a plurality of separation devices mounted to the separation deck, each separation device being operable to de-entrain liquid from the vapor-liquid mixture and discharge a vapor; and
    a vapor outlet nozzle coupled to the shell to receive the vapor discharged from the plurality of separation devices, wherein each separation device comprises:
        a body mounted to the separation deck and defining a central flow passage that receives a portion of the vapor-liquid mixture, wherein the body includes:
            an outer shell;
            an inner shell at least partially arranged within the outer shell, an inner wall of the inner shell comprising one or more ribs provided on and extending into the central flow passage; and
            a liquid flow passage defined between the outer and inner shells.

2. The kettle reboiler of claim 1, wherein each separation device further comprises:
    a cyclonic flow initiator arranged within the central flow passage and including a helical structure that defines a helical plane extending about a central axis of the cyclonic flow initiator along a helical path,
    wherein, as the portion of the vapor-liquid mixture traverses the helical path, the liquid within the portion of the vapor-liquid mixture is urged radially outward to separate the liquid from the vapor.

3. The kettle reboiler of claim 2, wherein the body further includes:
    a plurality of apertures defined in the inner shell and facilitating fluid communication between the central flow passage and the liquid flow passage to remove the liquid from the central flow passage.

4. The kettle reboiler of claim 3, wherein the liquid flow passage fluidly communicates with a top of the separation deck to deposit the liquid on the top of the separation deck.

5. The kettle reboiler of claim 2, wherein at least one of a width, a pitch, and an angle of the helical structure varies along an axial length of the cyclonic flow initiator.

6. The kettle reboiler of claim 2, wherein at least one of an upper surface and a lower surface of the helical plane defines a structure selected from the group consisting of a dimple, a corrugation, a fin, and any combination thereof.

7. The kettle reboiler of claim 2, wherein an edge of the helical structure defines a structure selected from the group consisting of a notch, a half-circle, a scallop, a corrugation, a fin, and any combination thereof.

8. The kettle reboiler of claim 2, further comprising:
    a center post extending along the central axis, wherein the helical structure is coupled to and extends about the center post; and
    a support structure coupled to the center post at at least two points of contact to support the cyclonic flow initiator within the central flow passage.

9. The kettle reboiler of claim 1, further comprising a downcomer fluidly coupled to the separation deck to receive the liquid de-entrained from the vapor-liquid mixture.

10. The kettle reboiler of claim 9, wherein the downcomer extends downward from the separation deck at a point above the liquid reservoir to deposit the liquid into the liquid reservoir.

11. The kettle reboiler of claim 9, further comprising a liquid outlet chamber defined within the shell, wherein the downcomer extends downward from the separation deck at a point above the liquid outlet chamber to deposit the liquid into the liquid outlet chamber.

12. The kettle reboiler of claim 9, wherein at least a portion of the separation deck is sloped to flow the liquid toward the downcomer.

13. A method of operating a kettle reboiler, comprising:
containing a first process fluid in a liquid reservoir defined within a shell of the kettle reboiler;
circulating a second process fluid through a tube bundle positioned within the liquid reservoir and at least partially submerged in the first process fluid;
boiling the first process fluid as the second process fluid circulates through the tube bundle and thereby discharging a vapor-liquid mixture from the first process fluid;
receiving the vapor-liquid mixture at a liquid-vapor separation assembly positioned in the shell, the liquid-vapor separation assembly including a separation deck and a plurality of separation devices mounted to the separation deck, wherein each separation device comprises a body mounted to the separation deck and defining a central flow passage, the body including:
an outer shell;
an inner shell at least partially arranged within the outer shell, an inner wall of the inner shell comprising one or more ribs provided on and extending into the central flow passage; and
a liquid flow passage defined between the outer and inner shells;
receiving a portion of the vapor-liquid mixture in the central flow passage;
de-entraining liquid from the vapor-liquid mixture with the plurality of separation devices and discharging a vapor from the plurality of separation devices; and
receiving the vapor discharged from the plurality of separation devices at a vapor outlet nozzle coupled to the shell.

14. The method of claim 13, wherein a cyclonic flow initiator is arranged within the central flow passage and including a helical structure that defines a helical plane extending about a central axis of the cyclonic flow initiator along a helical path, the method further comprising:
flowing the portion of the vapor-liquid mixture along the helical path; and
urging the liquid within the portion of the vapor-liquid mixture radially outward and thereby separating the liquid from the vapor as the portion of the vapor-liquid mixture flows along the helical path.

15. The method of claim 13, wherein a plurality of apertures are defined in the inner shell, the method further comprising:
receiving the liquid in the liquid flow passage via the plurality of apertures defined in the inner shell;
flowing the liquid from the liquid flow passage to a top of the separation deck; and
flowing the liquid on the top of the separation deck toward a downcomer.

16. The method of claim 15, wherein the downcomer extends downward from the separation deck at a point above the liquid reservoir, the method further comprising depositing the liquid into the liquid reservoir from the downcomer.

17. The method of claim 15, wherein a liquid outlet chamber is defined within the shell and the downcomer extends downward from the separation deck at a point above the liquid outlet chamber, the method further comprising depositing the liquid into the liquid outlet chamber from the downcomer.

18. The method of claim 14, wherein the helical structure is coupled to and extends about a center post extending along the central axis, the method further comprising supporting the cyclonic flow initiator within the central flow passage with a support structure coupled to the center post.

19. The method of claim 14, further comprising varying at least one of a width, a pitch, and an angle of the helical structure along an axial length of the cyclonic flow initiator.

* * * * *